Feb. 14, 1956  E. M. SMOLIN  2,734,928
PRODUCTION OF DIARYLETHANES
Filed May 27, 1953
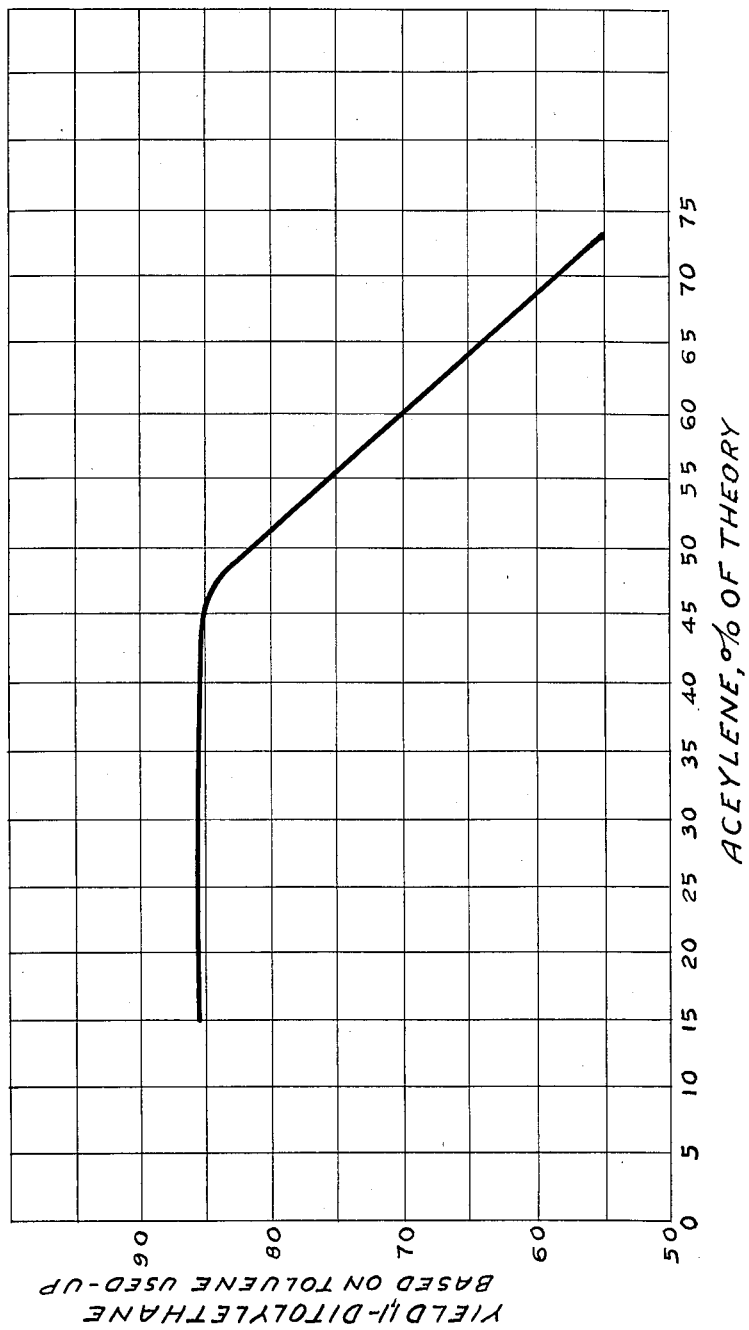
INVENTOR
EDWIN M. SMOLIN,
BY
John V. Whittenburg
ATTORNEY United States Patent Office 2,734,928
Patented Feb. 14, 1956

2,734,928

PRODUCTION OF DIARYLETHANES

Edwin M. Smolin, Stamford, Conn., assignor to American Cyanamid Company, New York, N. Y., a corporation of Maine Application May 27, 1953, Serial No. 357,800

14 Claims. (Cl. 260—668)

This invention relates to the process of producing unsymmetrical diarylethanes. More particularly, this invention relates to the production of 1,1-diarylethanes wherein acetylene is reacted with a mono- or di-alkyl substituted benzene.

The reaction of acetylene with such compounds as toluene and xylene to produce diarylethanes is known. In the prior art processes of carrying out this reaction, low yields and generally unsatisfactory results have been obtained. Such a process is that described in "Organic Synthesis," Coll. vol. I, 2nd edition, p. 229. The product of this reaction is a mixture of six possible isomers, including about 10% of 1,1-bis (4-methylphenyl) ethane, about 90% of 1-(2-methylphenyl)-1-(4-methylphenyl) ethane, and the balance being other 1,1-diarylethanes including some having meta-substitution. The yield of the diarylethanes obtained employing this process is only 60% based on the acetylene charged into the reaction.

The objects of my invention are to prepare 1,1-diarylethanes by the reaction of acetylene with a compound selected from the group consisting of mono- and di-alkyl substituted benzenes. A further object of my invention is the production of 1,1-diarylethanes wherein the yields obtained are greater than 75% theoretical based on the amount of acetylene and substituted benzenes reacted. Still another object of the present invention is to provide a process whereby reaction conditions employed are carefully controlled to obtain yields not heretofore possible by the reaction of acetylene with mono- and dialkyl substituted benzenes. These and other objects of my invention will be discussed more fully hereinbelow.

The production of diarylethanes is desired inasmuch as the compounds may be cracked to produce substituted styrenes. The polymers of such substituted styrenes, as methyl and dimethylstyrene, possess certain improved physical properties, e. g., high heat distortion, when compared to polystyrene. However, by the known processes of production of diarylethanes, the cost of operation of the processes has not allowed any significant commercialization of these compounds. As previously stated, the production of diarylethanes by the reaction of acetylene with compounds such as toluene and xylene has not given satisfactory yields. In another process, such as the reaction of paraldehyde with toluene or xylene in the presence of hydrogen fluoride, the use of the hydrogen fluoride involves recovery and recycling procedures which tend to detract from the commercial attractiveness of the process and also add to the cost of the process. The process of my invention, thus, gives satisfactory commercial yields and is not burdened with the unattractive features of the prior art.

In the process of my invention, acetylene is reacted with a compound selected from the group consisting of mono- and di-alkyl substituted benzenes in the presence of a sulfuric acid-mercuric sulfate catalyst. When the conversion of a mono- or di-alkyl substituted benzene with acetylene is carried out as disclosed in the prior art, the yield of the 1,1-diarylethane is only about 60% based on the acetylene charged into the reactor and upon the mono- or di-alkyl substituted benzene used up. The process, as carried out in the prior art, charged 70% or more of the stoichiometric amount of acetylene required to react with all of the mono- or di-alkyl substituted benzene into the reactor. I have found that when from about 15% to about 45% of the stoichiometric amount of acetylene theoretically required to react with all of the substituted benzene is charged into the reactor, yields greater than 75% are obtained based on the acetylene charged and the substituted benzene used up. When over 45% of the theoretical amount of acetylene required to react with all of the mono- or di-alkyl substituted benzene is charged into the reaction vessel, the yield of 1,1-diarylethane obtained surprisingly falls off. It is, therefore, necessary in carrying out the process of my invention that the amount of acetylene utilized be not greater than 45% of the stoichiometric amount required to react with all of the mono- or di-alkyl substituted benzene present. By limiting the stoichiometric amount of acetylene that is introduced into the reactor, yields in excess of 75% are obtained inasmuch as the reaction of the 1,1-diarylethane produced with acetylene and toluene or acetylene and itself to form triaryldiethanes and tetraryltriethanes, respectively, is minimized. Thus, by controlling the concentration of 1,1-diarylethane produced, I also reduce the tendency of the 1,1-diarylethanes to undergo the deleterious side reactions set forth. Accordingly, it will readily be seen that when the amount of acetylene introduced into the reaction vessel is carefully controlled, the yield of 1,1-diarylethane obtained is such that the undesirable side reactions are limited and therefore the yield is greater than 75% based on the acetylene charged and on the mono- or di-alkyl substituted benzene used up. To illustrate the decrease of the yield when an increased amount of acetylene is employed, the single figure of the drawing is set forth. In the figure of the drawing, the yield of 1,1-ditolylethane based on the amount of toluene used up is shown on the abscissa while the amount of acetylene introduced into the reaction vessel is shown on the ordinate.

Examples of mono- and di-alkyl substituted benzenes that may be utilized in the process of my invention are such as toluene, o-, p-, m-xylenes, ethylbenzene, and the like. It is also possible to react long-chain mono- and di-alkyl substituted benzenes in the process of my invention, the only limiting factor being the availability of the substituted benzenes. The catalyst employed in the process of my reaction is sulfuric acid containing mercuric sulfate, which is finely ground and dispersed therein. Sulfuric acid of concentrations of from about 85% to about 105% may be employed in the instant process. It is preferred, however, that sulfuric acid of from about 88% to about 98.5% be utilized. The amount of sulfuric acid that is used in the process of my invention may vary over rather wide limits, for example, from about 1 part of sulfuric acid per part of substituted benzene charged to about 1 part of sulfuric acid to about 25 parts of substituted benzene charged. It is preferred, however, that from about 1:12 to about 1:5 parts of sulfuric acid be employed per part of substituted benzene. The amount of mercuric sulfate that is dispersed in the sulfuric acid catalyst may also vary over rather wide limits. The amount of mercuric sulfate utilized is calculated as parts of metallic mercury present per part of sulfuric acid. Thus, from about 1:2500 to about 1:150 parts of mercuric sulfate calculated as parts of metallic mercury per part of sulfuric acid may be utilized in the process. It is preferred, however, that from about 1:1000 to about 1:333 parts of mercuric sulfate calculated as parts of metallic mercury per part of sulfuric acid be employed.

In carrying out the process of my invention, the desired amount of substituted benzene is placed in a suitable reaction vessel and cooled to about 5° C. below the desired reaction temperature, stirring of the substituted benzene begun, and the sulfuric acid and powdered metallic mercury salt catalyst added. The reaction may be carried out at a temperature from about −20° C. to about 70° C. Stirring of the mixture is maintained throughout the reaction to emulsify the acid and the hydrocarbons and to prevent catalyst deposition at the bottom of the reactor. The measured amount of acetylene is then introduced into the reactor over the period necessary to introduce the desired calculated amount. After the acetylene addition is complete, the stirring of the reaction mixture is discontinued, the reaction mixture is separated and the 1,1-diarylethane recovered therefrom. When the reaction is carried out at below 0° C., the reaction mixture is more difficult to work up and the separation of the acid layer from the desired product is slower. Therefore, it is preferred that a temperature range of from about 0° C. to 45° C. be employed in the process.

In order that those skilled in the art may more full understand the inventive concept herein presented, the following examples are given by way of illustration and not limitation unless otherwise noted in the appended claims. All parts are parts by weight.

EXAMPLE 1 (Comparative)

Into a suitable reaction vessel equipped with a thermocouple well, a stirrer fitted through a rubber-type sleeve, a gas inlet tube, and a gas exit tube, a mixture of 368 parts of toluene, 78.2 parts of 95.5% sulfuric acid and 4.25 parts of pulverized mercuric sulfate was treated with 36 parts of acetylene (70% of theory) passed in as a gas. The reaction was carried out at 10° C.–15° C. as set forth in "Organic Synthesis," Coll. vol. I, above noted. Distillation of the product after washing gave 171.5 parts of 1,1-ditolylethane which represents a yield of 60.4% based on acetylene and 62.5% based on the toluene consumed.

EXAMPLE 2

Into a mixture of 1288 parts of toluene and 175 parts of 95.5% sulfuric acid, the latter containing 0.113 parts of mercuric sulfate, was added by means of a calibrated orifice 27.3 parts of acetylene (15% of theory) over a period of 35 minutes with vigorous stirring. An ice-water bath was used to cool the flask and maintain an internal temperature of 8–10° C. During the course of the run, 0.195 additional parts of finely-divided mercuric sulfate were added. After acetylene addition was completed, the reaction mixture was stirred slowly for an additional 5 minutes and 200 parts of water was added slowly with stirring, keeping the temperature below 15° C. The organic layer was removed and distilled. A total of 1088 parts of toluene was recovered. A yield of 196 parts of 1,1-ditolylethane was obtained distilling at 150° C. at 10 mm. pressure. The yield based on toluene used up was 85.7% and based on acetylene charged was 88.6%.

EXAMPLE 3

The procedure employed in Example 2 was repeated except that 54.6 parts of acetylene (30% of theory) was added over a period of 70 minutes with vigorous stirring. The organic layer removed and distilled yielded a total of 927.4 parts of recovered toluene. A yield of 350.5 parts of 1,1-ditolylethane was obtained by distilling at 150° C. at 10 mm. pressure. The yield based on toluene used up was 85.0%.

EXAMPLE 4

The procedure employed in Example 2 was repeated except that 81.0 parts of acetylene (45% of theory) was added over a period of 105 minutes with vigorous stirring. The organic layer removed and distilled yielded 803 parts of toluene recovered. A yield of 469 parts of 1,1-ditolylethane was obtained distilling at 150° C. at 10 mm. pressure. The yield based on toluene used up was 84.7%.

EXAMPLE 5

The procedure employed in Example 2 was repeated using 1000 parts of o-xylene into which was added 110 parts of 97% sulfuric acid containing 0.225 part of mercuric sulfate. 44.3 parts of acetylene (36% of theory) was added over a period of 113 minutes with vigorous stirring. The organic layer removed and distilled yielded a total of 350 parts of dixylylethane. This yield based on o-xylene used up was 86.2% and based on acetylene was 86.4%.

EXAMPLE 6

The procedure employed in Example 5 was repeated except that 1000 parts of m-xylene was substituted for the o-xylene. A yield of 377.5 parts of dixylylethane was obtained. This yield based on m-xylene used up was 86.0% and based upon acetylene was 93.2%.

EXAMPLE 7

The procedure employed in Example 5 was repeated substituting 1000 parts of ethylbenzene for the o-xylene. A yield of 360 parts of 1,1-di-(ethylphenyl) ethane was obtained. This yield based on ethylbenzene used up was 81.0% and based upon acetylene was 88.9%.

The process of my invention may be carried out as a batch or as a multi-stage continuous operation. In the batch process, the substituted benzene and sulfuric acid containing the dispersed mercuric sulfate is introduced into the reaction vessel as above disclosed. The measured amount of acetylene is then charged into the reaction vessel and the reaction carried out. While the reaction may be carried out in a single-stage continuous reactor, it is preferred that the reaction be carried out in a multi-stage continuous reactor. I have found that the average concentration of 1,1-diarylethane present in the reaction product will determine the percent yield of the 1,1-diarylethane recovered. It is apparent that a theoretical conversion of toluene to 100% of the 1,1-diarylethane could be realized. However, as the per cent concentration of 1,1-diarylethane increased in the reaction mixture, undesirable side reactions take place involving the 1,1-diarylethane which decrease the ultimate yield of the 1,1-diarylethane recovered. Thus, by controlling the average concentration of the 1,1-diarylethane in the reaction mixture, optimum yields are obtained.

I have found that carrying out the reaction in a batch operation gives satisfactory yields. Inasmuch as a batch operation entails charging and discharging the reactor after each reaction, it is desirable to carry out the reaction in a multi-stage continuous reactor. Keeping in mind the fact that the yield of 1,1-diarylethane recovered and not the conversion to 1,1-diarylethane is controlling in my invention, the following hypothetical situation is presented. Taking a batch operation as the basis for my discussion, it will be assumed that a concentration of A parts of 1,1-diarylethane is desired in the final product. The concentration of 1,1-diarylethane at the start of the reaction will of course be zero, and the average concentration of 1,1-diarylethane during the reaction will be $(A+0)/2$ or $A/2$. If A is equal to 40% conversion to 1,1-diarylethane, the yield of 1,1-diarylethane obtained based on the substituted benzene used up is in the order of 85%. When a single-stage continuous operation is carried out, the concentration of 1,1-diarylethane at the beginning and at the end of the reaction is constant. Therefore, the average concentration of 1,1-diarylethane is $(A+A)/2$ or A. Since an increased average concentration of 1,1-diarylethane in the reaction mixture causes undesirable side reactions to take place, the final yield of 1,1-diarylethane obtained in a single-stage continuous reactor is less than that obtained in a batch reactor. In order to obtain yields approaching those obtained in a batch reactor, it is necessary to employ a multi-stage continuous reactor. Here, the desired amount of toluene and sulfuric acid containing mercuric sulfate dispersed therein is introduced into the first stage of the reactor. The amount of acetylene introduced into each stage of the reactor is $1/n$th of the total amount of acetylene introduced throughout the reaction wherein $n$ is equal to the number of stages in the reactor. Thus, in a four-stage reactor, the concentration in each stage at the beginning and the end of the reaction is $A/4$, $2A/4$ or $A/2$, $3A/4$ and $4A/4$ or $A$, respectively. The average concentration of 1,1-diarylethane in the final product will be $(A/4+A/2+3A/4+A) \div 4$ equals $5A/8$. This average concentration of 1,1-diarylethane approaches that obtained in a batch reactor and, consequently, allows greater yield of 1,1-diarylethane than that for a single-stage continuous reactor. From the above discussion, it will be seen that if a multi-stage continuous reactor of $n$ stages is employed to carry out the reaction to conversion $A$, the average concentration of 1,1-diarylethane in the final product will be $$(A/n + 2A/n + 3A/n + \ldots nA/n) \div n$$

or $A/n^2(1+2+3+ \ldots n)$. Thus, as the number of stages in the continuous reactor approaches infinity, the average concentration of 1,1-diarylethane in the final product approaches $A/2$ or that obtained in a batch reactor.

In order that those skilled in the art may fully understand the inventive concept herein discussed, the following examples are set forth for purposes of illustration and not limitation unless otherwise noted in the appended claims. All parts are parts by weight.

EXAMPLE 8

A single-stage continuous reaction was carried out by charging 360 parts of toluene, 47.8 parts of 98% sulfuric acid containing 0.078 part of dispersed mercuric sulfate calculated as parts of metallic mercury, and 20.7 parts of acetylene into the reactor. The reaction was then carried out continuously by bleeding from the reactor an amount of product equal to the amount of reactant introduced in the proportion above set forth. The yield of 1,1-ditolylethane was 125 parts which was 75% based on the toluene used up.

EXAMPLE 9

A four-stage continuous reaction was carried out by charging 1502 parts of toluene and 196 parts of 98% sulfuric acid containing dispersed therein 0.316 part of finely-divided mercuric sulfate calculated as parts of metallic mercury. Since it was desired to react 84.4 parts of acetylene with this amount of toluene, 21.1 parts of acetylene was introduced in each stage of the reactor. The reaction was carried out continuously with bleeding that amount of product from stage 4 equal to the amount of reactants introduced into the reactor. The product when distilled gave a yield of 564 parts of ditolylethane which was 84% based on the toluene used up.

The following table is set forth to show the yield of 1,1-ditolylethane obtained with the conversion to 1,1-ditolylethane carried to 40% in a batch, single-stage continuous, and 4-stage continuous reactor.

Table

| Method | Stage No. | Concentration | | Average Concentration | Yield based on Toluene used up, percent |
|---|---|---|---|---|---|
| | | Initial | Final | | |
| Batch | | 0 | 40 | 20 | 85 |
| Single-stage Continuous | 1 | 40 | 40 | 40 | 73.5 |
| Four-stage Continuous | 1 | 10 | 10 | 10 | |
| | 2 | 20 | 20 | 20 | |
| | 3 | 30 | 30 | 30 | |
| | 4 | 40 | 40 | 40 | |
| Overall Average Concentration | | | | 25 | 84 |

The 1,1-diarylethanes produced in accordance with the process of my invention may be catalytically cracked in the vapor phase to yield nuclear substituted styrenes. The process employed to catalytically crack the 1,1-diarylethanes produced may be carried out in accordance with those disclosed in U. S. Patents Nos. 2,373,982; 2,420,688; 2,420,689; 2,422,163; 2,422,164; 2,422,165; 2,422,169; 2,422,171; and 2,422,318.

I claim:

1. In the process of producing 1,1-diarylethanes wherein acetylene is reacted with a compound selected from the group consisting of mono- and di-alkyl substituted benzene in the presence of a sulfuric acid-mercuric sulfate catalyst, the improvement which comprises reacting from about 15% to about 45% of the stoichiometric amount of acetylene required to react with all of the compound selected from the group consisting of mono- and di-alkyl substituted benzene.

2. In the process of producing 1,1-ditolylethane wherein acetylene is reacted with toluene in the presence of a sulfuric acid-mercuric sulfate catalyst, the improvement which comprises reacting from about 15% to about 45% of the stoichiometric amount of acetylene required to react with all of the toluene.

3. In the process of producing 1,1-dixylylethane wherein acetylene is reacted with xylene in the presence of a sulfuric acid-mercuric sulfate catalyst, the improvement which comprises reacting from about 15% to about 45% of the stoichiometric amount of acetylene required to react with all of the xylene.

4. In the process of producing 1,1-di-o-xylylethane wherein acetylene is reacted with o-xylene in the presence of a sulfuric acid-mercuric sulfate catalyst, the improvement which comprises reacting from about 15% to about 45% of the stoichiometric amount of acetylene required to react with all of the o-xylene.

5. In the process of producing 1,1-di-m-xylylethane wherein acetylene is reacted with m-xylene in the presence of a sulfuric acid-mercuric sulfate catalyst, the improvement which comprises reacting from about 15% to about 45% of the stoichiometric amount of acetylene required to react with all of the m-xylene.

6. In the process of producing 1,1-di-(ethylphenyl)ethane wherein acetylene is reacted with ethylbenzene in the presence of a sulfuric acid-mercuric sulfate catalyst, the improvement which comprises reacting from about 15% to about 45% of the stoichiometric amount of acetylene required to react with all of the ethylbenzene.

7. In the process of producing 1,1-diarylethane wherein acetylene is reacted with a compound selected from the group consisting of mono- and di-alkyl substituted benzene in the presence of a sulfuric acid-mercuric sulfate catalyst, the improvement which comprises reacting in a multi-stage continuous reaction from about 15% to about 45% of the stoichiometric amount of acetylene required to react with all of the compound selected from the group consisting of mono- and di-alkyl substituted benzene, the amount of acetylene introduced into each stage of the reaction being $1/n$th of the total amount reacted and wherein $n$ is equal to the number of stages in the multi-stage continuous reaction.

8. In the process of producing 1,1-ditolylethane wherein acetylene is reacted with toluene in the presence of a sulfuric acid-mercuric sulfate catalyst, the improvement which comprises reacting in a multi-stage continuous reaction from about 15% to about 45% of the stoichiometric amount of acetylene required to react with all of the toluene, the amount of acetylene introduced into each stage of the reaction being $1/n$th of the total amount reacted and wherein $n$ is equal to the number of stages in the multi-stage continuous reaction.

9. In the process of producing 1,1-dixylylethane wherein acetylene is reacted with xylene in the presence of a sulfuric acid-mercuric sulfate catalyst, the improvement which comprises reacting in a multi-stage continuous reaction from about 15% to about 45% of the stoichiometric amount of acetylene required to react with all of the xylene, the amount of acetylene introduced into each stage of the reaction being 1/nth of the total amount reacted and wherein n is equal to the number of stages in the multi-stage continuous reaction.

10. In the process of producing 1,1-di-o-xylylethane wherein acetylene is reacted with o-xylene in the presence of a sulfuric acid-mercuric sulfate catalyst, the improvement which comprises reacting in a multi-stage continuous reaction from about 15% to about 45% of the stoichiometric amount of acetylene required to react with all of the o-xylene, the amount of acetylene introduced into each stage of the reaction being 1/nth of the total amount reacted and wherein n is equal to the number of stages in the multi-stage continuous reaction.

11. In the process of producing 1,1-di-m-xylylethane wherein acetylene is reacted with m-xylene in the presence of a sulfuric-mercuric sulfate catalyst, the improvement which comprises reacting in a multi-stage continuous reaction from about 15% to about 45% of the stoichiometric amount of acetylene required to react with all of the m-xylene, the amount of acetylene introduced into each stage of the reaction being 1/nth of the total amount reacted and wherein n is equal to the number of stages in the multi-stage continuous reaction.

12. In the process of producing 1,1-di-(ethylphenyl)ethane wherein acetylene is reacted with ethylbenzene in the presence of a sulfuric acid-mercuric sulfate catalyst, the improvement which comprises reacting in a multi-stage continuous reaction from about 15% to about 45% of the stoichiometric amount of acetylene required to react with all of the ethylbenzene, the amount of acetylene introduced into each stage of the reaction being 1/nth of the total amount reacted and wherein n is equal to the number of stages in the multi-stage continuous reaction.

13. In the process of producing 1,1-diarylethane wherein acetylene is reacted with a compound selected from the group consisting of mono- and di-alkyl substituted benzene in the presence of a sulfuric acid-mercuric sulfate catalyst, the improvement which comprises reacting in a four-stage continuous reaction from about 15% to about 45% of the stoichiometric amount of acetylene required to react with all of the compound selected from the group consisting of mono- and di-alkyl substituted benzene, the amount of acetylene introduced into each stage of the reaction being ¼ of the total amount reacted.

14. In the process of producing 1,1-ditolylethane wherein acetylene is reacted with toluene in the presence of a sulfuric acid-mercuric sulfate catalyst, the improvement which comprises reacting in a four-stage continuous reaction from about 15% to about 45% of the stoichiometric amount of acetylene required to react with all of the toluene, the amount of acetylene introduced into each stage of the reaction being ¼ of the total amount reacted.

References Cited in the file of this patent

UNITED STATES PATENTS 2,439,228     Sturrock et al. _____ Apr. 6, 1948

OTHER REFERENCES

Reichert et al.: J. Am. Chem. Soc., vol. 45 (1923), page 3090.

Reilly et al.: J. Am. Chem. Soc., vol. 50 (Sept. 5, 1928), page 2564.